Nov. 9, 1965   R. L. BOYLES   3,216,189
AUTOMATIC REGULATOR FOR TIMEKEEPING DEVICES
Filed Jan. 7, 1959   3 Sheets-Sheet 1

Inventor:
Robert L. Boyles
by Leonard J. Platt
His Attorney

Nov. 9, 1965     R. L. BOYLES     3,216,189
AUTOMATIC REGULATOR FOR TIMEKEEPING DEVICES
Filed Jan. 7, 1959     3 Sheets-Sheet 2

Inventor:
Robert L. Boyles
by *Leonard J. Platt*
His Attorney

Nov. 9, 1965  R. L. BOYLES  3,216,189
AUTOMATIC REGULATOR FOR TIMEKEEPING DEVICES
Filed Jan. 7, 1959  3 Sheets-Sheet 3
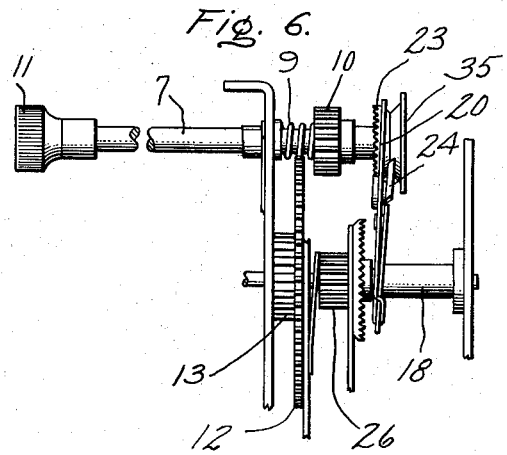
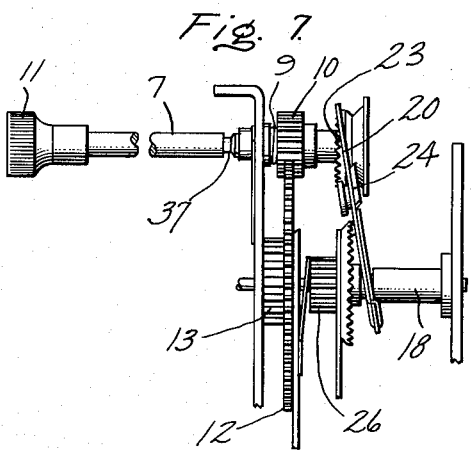
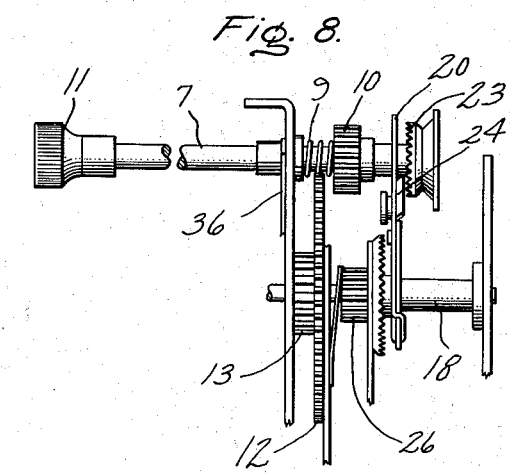
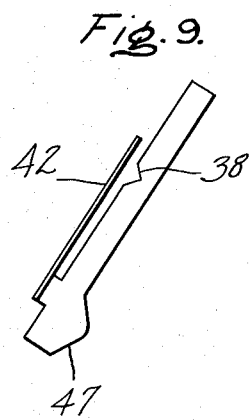
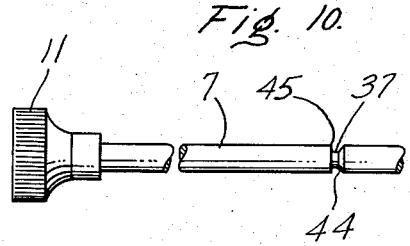
Inventor:
Robert L. Boyles,
by Leonard J Platt
His Attorney.

3,216,189
AUTOMATIC REGULATOR FOR TIMEKEEPING DEVICES

Robert L. Boyles, Wayland, Mass., assignor, by mesne assignments, to King-Seeley Thermos Co., a corporation of Michigan
Filed Jan. 7, 1959, Ser. No. 785,397
9 Claims. (Cl. 58—85.5)

This invention relates to timekeeping devices, and more particularly to arrangements for automatically adjusting the rate regulating mechanism of such timekeeping devices.

In a timekeeping device of the type illustrated in my application, Serial No. 502,488, filed April 19, 1955, and assigned to the same assignee as the present invention, a pivoted adjusting lever is arranged for transmitting motion to a rate regulating mechanism, which conventionally comprises means for changing the effective length of the balance wheel hair spring of the timekeeping device. A manually rotatable set shaft, axially slidable between a setting and a non-setting position is provided for setting the hands of the timepiece, and a member is provided on the rotatable set shaft for engaging and shifting the pivoted adjusting lever when the hands are set. Thus, the rate regulating mechanism may be moved in one direction or the other depending upon the direction in which the set shaft is rotated to set the timekeeping device to the correct time. The movement of the adjusting lever, and hence, the regulating mechanism is proportional to the amount of rotational movement of the time setting shaft. In addition, provision is made for limiting the movement of the adjusting lever and hence, the adjustment of the regulating mechanism to a predetermined maximum amount each time the hands are set. As illustrated in a preferred embodiment of my prior above-mentioned application, this is accomplished by having the adjusting lever move out of engagement with the member on the set shaft after a predetermined maximum movement of the rotatable set shaft.

In the above type of arrangement for automatically adjusting the rate of the timepiece, although means is provided for limiting the shifting of the regulating mechanism to a predetermined maximum amount each time the hands are set, it has been found that undesirable adjustments of the regulating mechanism can occur if the hands are repeatedly set to achieve a single large change in the position of the hands. This could occur, for example, when the timekeeping device has been allowed to stop and it becomes necessary to rotate the hand setting shaft through a number of complete revolutions in order to set the hands to the correct time. Since it is somewhat awkward to maintain the hand setting shaft fully pulled out in the hand setting position while setting the hands through a number of complete revolutions, the user may allow the hand setting shaft to be returned to the non-setting position. Thus, should the user find it necessary to move the hand setting shaft from the non-setting position to the setting position ten different times before completely setting the hands to the desired time, ten spurious predetermined maximum automatic adjustments would have been made in the rate regulation mechanism and the mechanism would be rendered completely out of adjustment.

Accordingly, it is a primary object of this invention to provide an improved foolproof arrangement for automatically adjusting the rate of a timekeeping device to prevent spurious adjustments from being introduced in the rate regulating mechanism.

It is a further object of the invention to provide an improved automatic regulating mechanism for timekeeping devices in which the automatic adjusting means for the regulating mechanism is locked out or rendered inoperative after a single predetermined maximum rate adjustment is made during a hand setting operation.

A still further object of the invention is to provide timed means for automatically reactivating the automatic adjusting means after it has been rendered inoperative.

In accordance with one aspect of this invention, a timekeeping device comprising time indicating means is provided with means for setting the hands of the time indicating means and a rate regulating mechanism for adjusting the running speed of the timekeeping device. A lever is arranged to become meshed with a regulating gear mounted on and rotatable with the setting means when the setting means is in its setting position for shifting the rate regulating mechanism and to move out of mesh with the regulating gear on the time setting means when movement of the setting means exceeds a predetermined maximum amount. Automatically actuated lockout means is provided for maintaining the lever out of mesh with the setting means after it has been moved out of mesh therewith while permitting the setting means to be moved between a non-setting position and its setting position to further set the time indicating means. By this arrangement, the lockout device permits only one predetermined maximum adjustment to be transmitted to the rate regulating mechanism before it becomes effective to prevent further adjustments from automatically being made to the rate regulating mechanism upon repeated actuation of the hand setting means. Thus, a foolproof automatic rate regulation mechanism is achieved and the hand setting means may be repeatedly operated without seriously maladjusting the rate regulating mechanism.

Other objects and attendant advantages of this invention will be apparent from the following description taken in connection with the accompanying drawings in which:

FIG. 6 is a partial side elevational view of the timekeeping device shown in FIG. 1 with the parts in a non-setting position;

FIG. 7 is a partial side elevational view of the improved timekeeping device shown in FIG. 1 showing the setting means in a hand setting position with the rate regulating means held in a locked out position;

FIG. 8 is a side elevational view of the improved timekeeping device shown in FIG. 1 with the parts in a non-setting position;

FIG. 9 is a perspective view of the unique lockout latch; and

FIG. 10 is an enlarged partial side elevational view of the setting stem.

Figure 1:
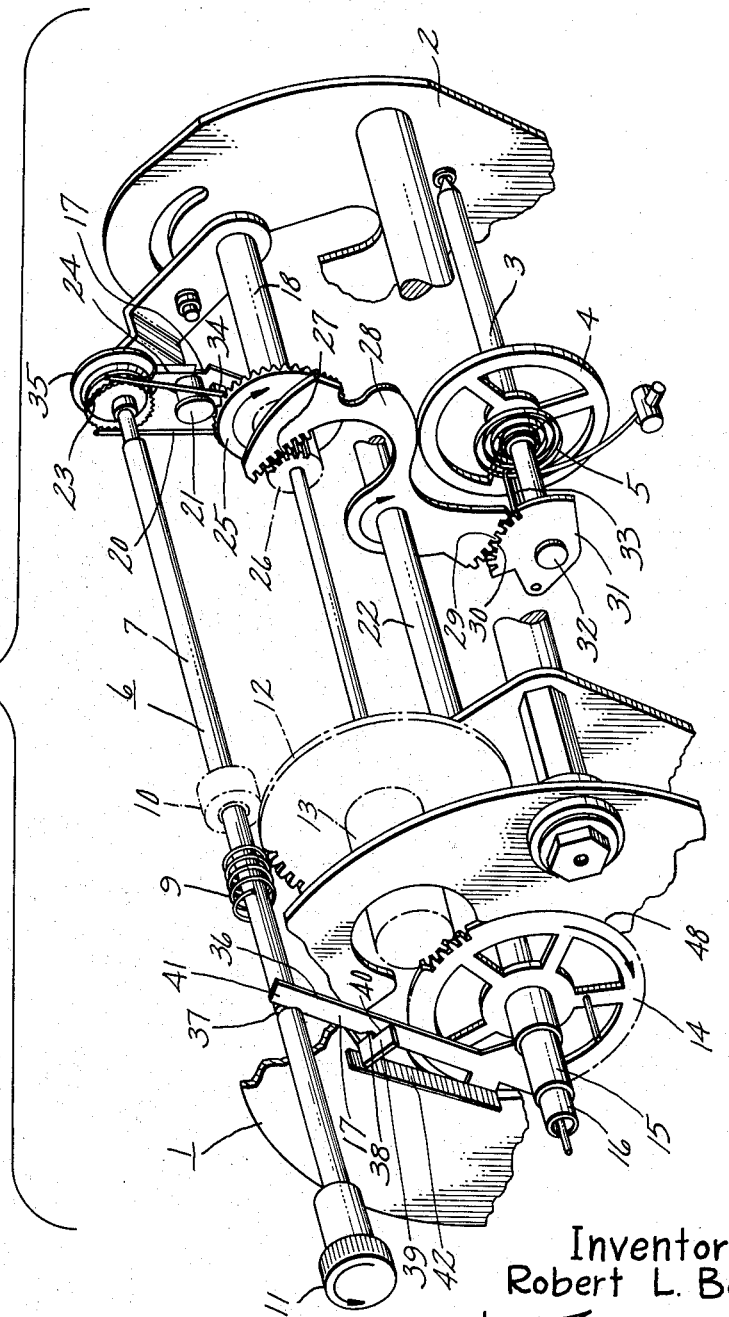
FIG. 1 is an exploded perspective view of a clock provided with the improved lockout arrangment, the view being partially broken away in order to show details thereof.

Referring now to the drawings, and first, particularly to FIG. 1, there is shown a portion of a timekeeping device including my improved lockout arrangement. Only portions of the mechanism essential for the proper illustration of my invention have been included since a complete disclosure of all of the gears normally employed in the average timekeeping device would unduly clutter and confuse the illustration of my invention. The mechanism illustrated in FIG. 1 includes a support or mounting plate shown in general outline and indicated by the numeral 1, a second mounting plate 2 spaced from plate 1, and a shaft 3 positioned between the two plates 1 and 2. A balance wheel 4 and a hair spring 5 are mounted on this shaft 3. The hair spring governs the rate of oscillation of the balance wheel and operation of the escapement mechanism (not shown) to control the speed of the timekeeping device in a conventional manner.

Figure 3:
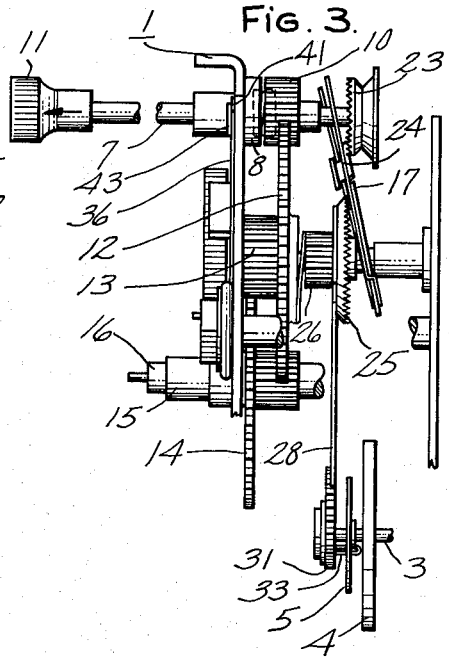
FIG. 3 is a partial side elevational view of the timekeeping device shown in FIG. 1 with the setting means and rate regulating means in a setting position.
Figure 5:
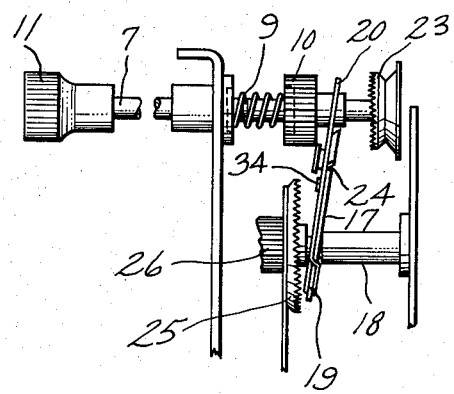
FIG. 5 is a partial side elevational view of the timekeeping device shown in FIG. 1 with the parts in a non-setting position.

The time setting means are shown generally at 6. As shown in FIG. 3, this means includes a shaft 7 which is rotatably and slidably mounted in a sleeve bearing 8 which is fixed to the mounting plate 1. As shown in FIG. 5, the time setting means, including the shaft 7, is biased to an extreme inward position by a spring 9, one end of which engages the mounting plate 1 and the other end of which engages a pinion gear 10. When it is desired to set the time of the timekeeping device, the shaft 7 is moved by means of a knob 11 from the position shown in FIG. 5 to the position shown in FIG. 3. This brings the pinion gear 10 into engagement with a gear 12, so that rotation of the pinion 10 effects rotation of the engaged gear 12. The gear 12 is connected through gear 13 and hour hand gear 14 to hour hand shaft 15. In a conventional manner, an hour hand (not shown) may be fixed to hour hand shaft 15 and gearing (not shown) is provided for translating movement of the hour hand gear 14 to a minute hand shaft 16. Since details of this gearing are unnecessary for disclosure of my invention, such unnecessary conventional elements have been omitted from the drawing. Setting of the time is, therefore, effected by first pulling outwardly on knob 11 to move the shaft 7 and its associated elements to the position as shown in FIG. 3. The knob is then rotated in one direction or the other to set the hands of the timekeeping device to indicate correct time. The knob 11 is then released and the spring 9 moves the pinion gear 10 rearwardly out of mesh with gear 12.

A mechanism is provided between the time setting means 6 and the timekeeping device rate regulating mechanism to automatically adjust the rate of the timekeeping device when the knob 11 of the time setting means is rotated to set the time indicating means to the proper time. This mechanism includes a pivoted adjusting lever 17. As shown more particularly in FIG. 5, the lever 17 is loosely pivotally mounted on a shaft 18 for clockwise or counter clockwise movement from the dotted line position shown in FIG. 2. Referring now to FIG. 1 and FIG. 5, the adjusting lever 17 is slotted at the rear portion 19 thereof for receiving and holding a hair pin shaped spring 20. The arms of spring 20 straddle a lug 21 formed on lever 17 and shaft 7 to bias the lever 17 to the mid-portion shown in FIG. 2. As can be seen from FIG. 3 when the time setting means is moved to the setting position illustrated, the toothed portion of crown gear 23 is brought into meshing engagement with a tip portion 24 of the adjusting lever 17.

As shown in FIG. 1 arranged on the shaft 18 to the left of the adjusting lever 17 is a crown gear 25. A pinion 26 is secured to or formed integral with crown gear 25. This pinion 26 is arranged to engage the teeth 27 of an intermediate gear lever 28 which is pivotally mounted on a shaft 22. Teeth 29 are formed on the lower portion of gear lever 28 for operative engagement with the teeth 30 of a sector gear 31 which is pivotally mounted on a stud 32. Thus, rotation of the crown gear 25 and the pinion 26 effects rotation of intermediate gear lever 28 and sector gear 31. A hook or member 33 is fixed to the sector gear 31. This hook 33 is arranged to engage the hair spring 5 for determining the effective length of the hair spring, and hence, the rate of oscillation of the mechanism controlled thereby. As the sector element 31 is moved in one direction or the other by the aforementioned pinion 26 and gear lever 28, it can be seen that the hook 33 moves in one direction or the other along the hair spring 5 thereby varying the effective length thereof.

In order to effect such movement of the gear lever 28 and the sector gear 31, provision is made for engagement of the crown gear 25 by the adjusting lever 17. Thus, the adjusting lever 17 includes a projection 34 generally in line with the teeth of crown gear 25. The projection 34 is normally slightly spaced from the teeth of crown gear 25 as illustrated in FIG. 5. However, the time setting means 6 is arranged so that when it is moved to the setting position, as illustrated in FIG. 3, it not only engages the tip 24 of the adjusting lever, but also moves the projection 34 between adjacent teeth of crown gear 25. The aforementioned movement of lever 17 provides operative engagement between the lever 17 and the crown gear 25 so that as the adjusting lever 17 is moved clockwise or counter clockwise away from the mid-position shown in FIG. 2, a corresponding rotation of crown gear 25 is effected. This rotation, as indicated above, is transmitted through pinion gear 26 to the sector element 31 to effect shifting in the rate regulating mechanism.

Provision is made for limiting the movement of the adjusting lever 17, and hence, of the rate regulating mechanism to a predetermined maximum regardless of the extent of movement of the time setting means beyond such predetermined maximum. This is desirable, of course, where the amount which the time indicating elements differ from the correct time is not attributable to the running speed of the timekeeping device; for example, where a change is made from daylight saving time, zone change and the like.

Figure 2:
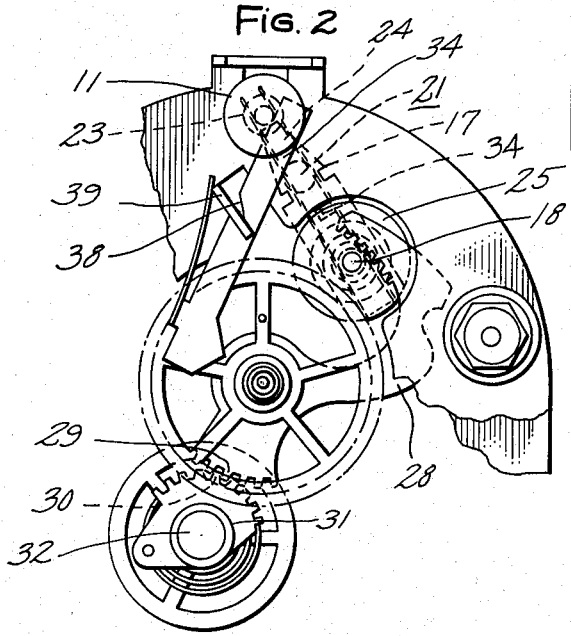
FIG. 2 is a partial front elevational view of the mechanism shown in FIG. 1.

As shown in FIGS. 1 and 2, this limitation of the movement of the adjusting lever 17 to the aforementioned predetermined maximum amount is achieved simply by allowing the lever 17 to move out of mesh with the teeth of crown gear 23 after a predetermined maximum rotary movement of the time setting means. Thus, for example, if the time setting means is rotated in a counter clockwise direction, as viewed in FIG. 2, the adjusting lever 17 will be moved to the right in a clockwise direction about pivot 18. When the time setting means has been moved by a predetermined maximum amount, the tip 24 of the adjusting lever will be driven out of engagement with the teeth of crown gear 23, as shown in FIG. 1, so that further rotation of the shaft 7 cannot cause any further clockwise movement of the adjusting lever 17. Correspondingly, if the time setting shaft 7 is moved in a clockwise direction, as viewed in FIG. 2, the adjusting lever 17 will be moved to the left or in a counter clockwise direction, and after a predetermined amount of rotary movement of the shaft 7 the tip 24 of the adjusting lever 17 will be moved out of engagement with the crown gear 23. Thereafter, further clockwise movement of the member 7 has no effect in causing any further counter clockwise movement of lever 17. The structure so far described is generally similar in overall operation and function to the invention disclosed in the prior application, Serial No. 502,488.

According to this invention, means are provided for moving and holding the tip 24 of lever 17 behind crown gear 23 when the tip has been moved out of engagement with the crown gear. To accomplish this, the sides of tip 24 are inwardly bent to provide positive engagement between the teeth of crown gear 23. With this arrangement, the teeth of crown gear 23 positively engage a side extremity of the tip portion 24 whenever the tip portion 24 is in engagement with the face of crown gear 23. Hence, crown gear 23 cannot slide on tip 24 without moving it, and after crown gear 23 has moved the tip 24 out of mesh therewith, the tip portion 24 readily drops off the edge of the crown gear 23 to a position behind the crown gear 23. As shown in FIG. 1, a dished disc 35 is fixed to the end of shaft 7 in abutting relationship with the rear surface of crown gear 23 for guiding the tip 24 of the adjusting lever between the rear surface of gear 23 and disc 35 when the tip 24 has been driven out of mesh with the teeth of crown gear 23.

It can be seen that with the structure so far described, whenever knob 11 is released following a time setting operation wherein tip 24 has been moved out of mesh with crown gear 23, inward movement of shaft 7 under the influence of spring 9 permits tip portion 24 of lever 17 to snap over the edge of crown gear 23 from the position shown in FIG. 1 to the position shown in FIG. 5. With the parts in the position shown in FIG. 5, it can be appreciated that should the knob 11 be subsequently pulled out to set the hands of the clock an automatic rate adjustment may be introduced in the timekeeping device since the teeth of crown gear 23 will be moved into mesh with the tip 24 of lever 17, and rotation of the stem 7 in a clockwise or a counter clockwise direction will effect movement of the crown gear 25 and sector gear 31 to vary the effective length of hair spring 5.

Lockout mechanism

There is combined with the aforedescribed timekeeping device elements a uniquely designed and arranged lockout mechanism for preventing the stem 7 from being returned to its extreme "in" position shown in FIG. 5 following a hand setting operation. Thus, if the tip 24 of lever 17 has been driven out of engagement with the teeth of crown gear 23 during such a hand setting operation, as shown in FIG. 1, the lockout mechanism prevents the tip 24 of lever 17 from snapping back to the left of crown gear 23 into an operative position with respect to the teeth of the crown gear 23. As previously indicated, such a lockout mechanism is particularly desirable for preventing spurious adjustments from being introduced in the rate regulating mechanism when it becomes necessary to pull knob 11 outwardly a plurality of times for effecting a single adjustment in the hands of the clock, as could occur, for example, when the time-keeping device has been allowed to stop.

As more particularly shown in FIG. 1 the lockout mechanism includes a latch 36 for engaging in a circumferential groove 37 formed in stem 7. The latch 36 may be uniquely formed from a single piece of flat sheet metal, and as shown in FIG. 9, is provided with a generally centrally disposed pivot notch 38 for cooperation with a tab 39 on mounting plate 1. As shown in FIG. 1, tab 39 may be conveniently bent up out of mounting plate 1 and may be slotted at 40 to guide the latch 36 between the front face of the mounting plate and the inside surface of tab 39.

Latch 36 is self-biased in a counter clockwise direction about tab 39 so that one end 41 thereof is maintained in contact with shaft 7. To achieve this, the latch is stamped as shown in FIG. 9, and an integral spring arm 42 is bent out of the plane of the latch to a position generally perpendicular thereto. With this arrangement, the latch 36 may be connected to tab 39 by simply sliding the latch 36 upwardly within slot 40 until the notch 38 is located at the reduced portion of the tab 39, and spring arm 42 is positioned at the left edge of tab 39. Thus, the need for a separate spring is eliminated.

As shown in FIG. 3, the sleeve bearing 8 for slidably mounting shaft 7 is provided with a slot 43 to allow the end 41 of lockout latch 36 to enter and engage the groove 37 on the set shaft 7. Preferably, as shown more particularly in FIG. 10, the right side surface 44 of groove 37 is tapered to permit the end 41 of latch 36 to easily slide on this tapered surface and be moved out of the groove 37 when the knob 11 is pulled outwardly from the position shown in FIG. 6 to the position shown in FIG. 7 to engage the time set gear 10 with gear 12. However, the opposite side surface 45 of groove 37 is arranged generally perpendicular to the axis of shaft 7 so that when the shaft 7 is released and is moved from the position shown in FIG. 7 to the position shown in FIG. 6, end 41 of latch 36 slides into the groove 37 and abuts the side surface 45 thereof to prevent further inward movement of the stem 7, as shown in FIGS. 1, 6 and 8.

With this arrangement, it can be seen that should knob 11 be pulled outwardly from the position shown in FIG. 5 to the position shown in FIG. 3 to set the hands a small increment, tip 24 of the adjusting lever 17 would be moved into mesh with the teeth of crown gear 23 to effect an adjustment in the rate regulating mechanism. When the knob 11 is released, latch 36 will move into groove 37 and will be forced against the side surface of mounting plate 1 to hold shaft 7 in the position shown in FIG. 8. Should the knob 11 be subsequently pulled out to set the hands, crown gear 23 will again be brought into engagement with the tip 24 of adjusting lever 17 to effect a further rate regulating adjustment when the stem is rotated. Thus, an initial incremental incorrect rotation of the stem can be corrected by simply rotating knob 11 in the correct direction to set the hands to indicate the correct time, and the final adjustment of the rate regulating lever 17 will nullify the initial incorrect adjustment. However, should the knob 11 be pulled outwardly and rotated to effect a large change in the position of the hands, tip 24 of adjusting lever 17 will be moved out of mesh with the teeth of crown gear 23 to the position shown in FIG. 7 between the rear surface of crown gear 23 and disc 35. With the parts in this position, when knob 11 is released, lockout latch 36 will move into groove 37 and will be forced against the side surface of mounting plate 1 to hold shaft 7 in the position shown in FIG. 6 with the tip 24 of the adjusting lever 17 between the rear surface of crown gear 23 and disc 35. Accordingly, should knob 11 be subsequently pulled out to set the hands, rotation of the knob 11 will not cause rotation of the adjusting lever 17. Thus, the hands may be repeatedly adjusted a large amount without seriously maladjusting the rate regulating mechanism by introducing a plurality of limited predetermined adjustments to the rate regulating mechanism. The adjusting lever 17 may be returned to an operative position with repsect to crown gear 25 by simply removing latch 36 from circumferential groove 37. When the latch 36 is removed from the groove 37 spring 9 forces the set shaft 7 inwardly to the position shown in FIG. 5, and during this movement the tip 24 of adjusting lever 17 is snapped to the left of crown gear 23.

Figure 4:
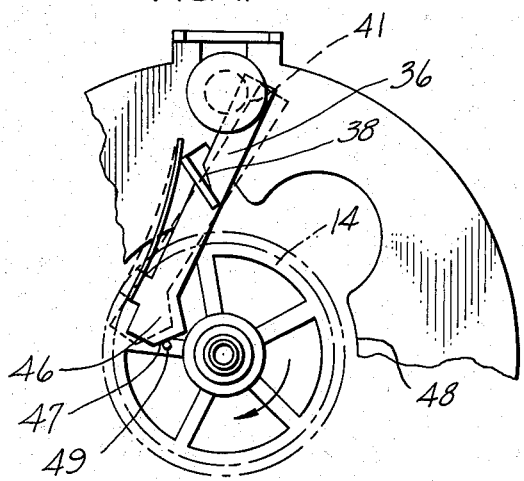
FIG. 4 is a partial front elevational view of the unique lockout arrangement.

In accordance with this invention, timed means is provided for removing the end 41 of the lockout latch 36 from circumferential groove 37. Accordingly, as shown in FIG. 4, the end 46 of latch 36 on the other side of pivot notch 38 is provided with an inclined surface 47, the mounting plate 1 of the timekeeping device is cut away at 48 to expose the hour hand gear 14, and a pin 49 is driven through a spoke on the hour hand gear 14. With this arrangement, the hour hand gear is rotated by the timing device in a clockwise direction as viewed in FIG. 4, pin 49 abuts inclined surface 47 of latch 36 and pivots latch 36 clockwise to the dotted line position once every 12 hours. This pivotal movement removes end 41 of latch 36 from groove 37 to permit spring 9 to reset shaft 7 to its extreme "in" position shown in FIG. 5. In this position, tip 24 of adjusting lever 17 is located to the left of crown gear 23 to thereby permit a rate adjustment to be automatically made the next time the hands are set.

From the foregoing description it will be appreciated that the improved lockout mechanism provided with timed means for automatically releasing the same comprises only two additional parts, a pin 49 driven through a spoke of the hour hand gear and a self-biased latch 36. Thus, an exceedingly simple yet effective lockout mechanism is achieved.

Operation

Let it be assumed that the timekeeping device has been allowed to stop and it is necessary to move the hands several hours back in order to set the hands to indicate the correct time; and let it also be assumed that the parts are in the position shown in FIG. 5. In order to set the hands to indicate the correct time, a user may pull knob 11 outwardly from the position shown in FIG. 5, to the position shown in FIG. 3 to engage the pinion gear 10 with gear 12. Simultaneously, tip 24 of the rate adjusting lever 17 will be placed in mesh with the teeth of crown gear 23 and projection 34 will be placed in engagement with the teeth of crown gear 25. Since it is desired to move the hands back to the correct time, knob 11 will be rotated in a counter clockwise direction as viewed in FIG. 2. A large adjustment of the hands is necessary, and thus, the knob may be rotated a half turn or more before it is released and allowed to snap inwardly under the influence of spring 9. During the first portion of such rotation, knob 11 will have been moved more than enough to cause tip 24 to be driven out of engagement with the teeth of crown gear 23 to thereby make a predetermined limited adjustment in the rate regulating mechanism. This adjustment will have increased the effective length of hair spring 5. Thus, if the clock had previously kept accurate time it would now run slightly slow. As the set knob 11 is released following the aforementioned half turn rotation in a counter clockwise direction, latch 36 will enter groove 37 and abut the side surface 45 thereof to thereby prevent the setting stem 7 from being moved any further inwardly than its position shown in FIG. 6. In this position, pinion gear 10 is disengaged from gear 12 and the tip 24 of adjusting lever 17 is held behind the teeth of crown gear 23. Continuing the hand setting operation, the user again pulls out set knob 11 to further rotate knob 11 in a counter clockwise direction in order to continue to set the hands back to indicate the correct time; however, any further rotation of knob 11 will not effect the rate adjusting mechanism since tip 24 is held between the rear surface of crown gear 23 and dished disc 35 out of mesh with the teeth of crown gear 23. Thus, knob 11 may be pulled outwardly any number of times to complete the hand setting operation without causing a further adjustment from being made in the effective length of hair spring 5.

After the hands have been set the lockout latch 36 will remain positioned in groove 37 until it is removed therefrom by pin 49. As previously described, pin 49 rotates with the hour hand gear 14 at one revolution every twelve hours. Thus, the lockout latch 36 will be released from stem 7 at some time within the twelve hour period following the above-mentioned hand setting operation depending on the location of pin 49 with respect to inclined surface 47 at the end of such hand setting operation. When the lockout latch releases stem 7, tip 24 of adjusting lever 17 snaps back over crown gear 23 to the position shown in FIG. 5. In a few days, if it is noticed that the clock is running a few minutes slow, the user simply pulls knob 11 outwardly to rotate the hands a few minutes ahead to the correct time. During such operation, crown gear 23 engages the tip 24 of adjusting lever 17, and the lever 17 is moved an amount proportional to the movement of the hands to thereby automatically adjust the rate of the time keeping device.

While there has been shown and described a particular embodiment of this invention, it will be obvious to those skilled in the art that various other changes and modifications can be made therein without departing from the invention, and more specifically for example, in place of the automatic means disclosed; manual means may be provided for releasing the lockout latch; and therefore, it is aimed in the appended claims to cover all such changes and modifications as fall within the true scope of the invention.

What I claim as new and desire to secure by Letters Patent of the United States is:

1. A timekeeping device comprising time indicating means; means for setting said time indicating means; regulating mechanism for adjusting the running speed of said device; and means for releasably coupling said setting means and regulating mechanism comprising a regulating gear on said time setting means and rotatable therewith, a lever in mesh with said setting means when said setting means is in its setting position for shifting said regulating mechansim, said lever being arranged to move out of mesh with the regulating gear of said setting means when rotary movement of said setting means exceeds a predetermined amount; and automatically actuated lockout means for maintaining said lever out of mesh with the regulating gear of said setting means but permitting said setting means to be moved between a non-setting position and its setting position to set said time indicating means.

2. A timekeeping device comprising time indicating means; means for setting said time indicating means; regulating mechanism for adjusting the running speed of said device; and means for releasably coupling said setting means and regulating mechanism comprising a regulating gear on said time setting means and rotatable therewith, a lever in mesh with the regulating gear of said setting means when said setting means is in its setting position for shifting said regulating mechanism, said lever being arranged to move out of mesh with the regulating gear of said setting means when movement of said setting means exceeds a predetermined amount; automatically actuated lockout means for maintaining said adjusting lever out of mesh with the regulating gear of said setting means but permitting said setting means to be moved between a non-setting position and its setting position to set the time indicating means, and timed means for automatically releasing lockout means to return said adjusting lever to an operative position with respect to the regulating gear of said setting means.

3. A timekeeping device comprising time indicating means; a set shaft for setting said time indicating means; a crown gear positioned on said set shaft for rotation therewith; a disc positioned on said set shaft adjacent to said crown gear; regulating mechanism for adjusting the running speed of said device; a lever in mesh with said crown gear when said set shaft is in its setting position for shifting said regulating mechanism in proportion to the rotary movement of the set shaft below a predetermined maximum amount, said lever being arranged to move out of mesh with the teeth of said crown gear when rotary movement of said set shaft exceeds said predetermined maximum amount, said lever being guided between the rear surface of said crown gear and said disc when the lever has moved out of mesh with the teeth of the crown gear; and automatically actuated lockout means for maintaining said lever between the rear surface of said crown gear and said disc but permitting the set shaft to be moved between a non-setting position and its setting position to set the time indicating means.

4. A timekeeping device comprising time indicating means; a set shaft mounted for rotary and axially slidable movement for setting said time indicating means; a crown gear positioned on said set shaft for rotation therewith; regulating mechanism for adjusting the running speed of said device; a lever in mesh with said crown gear when said set shaft is in its setting position for shifting said regulating mechanism in proportion to rotary movement of the set shaft below a predetermined maximum amount, said lever being arranged to move out of engagement with the teeth of said crown gear when rotary movement of said set shaft exceeds said predetermined maximum amount; and a latch self biased into engagement with said set shaft for limiting axially slidable movement of said set shaft to prevent said pivoted lever from becoming re-engaged with the teeth of said crown gear after it has moved out of engagement therewith, but permitting the set shaft to be moved between a non-setting position and its setting position to set the time indicating means.

5. A timekeeping device comprising time indicating means; a set shaft mounted for rotary and axially slidable movement for setting said time indicating means; a crown gear positioned on said set shaft for rotation therewith; regulating mechanism for adjusting the running speed of said device; a lever engaged by said crown gear when said set shaft is in its setting position for shifting said regulating mechanism; said lever being arranged to move out of engagement with the teeth of said crown gear when rotary movement of said set shaft exceeds a predetermined maximum amount; a circumferential groove formed in said set shaft; latch means arranged for insertion within said groove to restrict axially slidable movement of said set shaft to thereby maintain said adjusting lever out of engagement with the teeth of said crown gear while permitting said set shaft to be moved between a non-setting position and its setting position to set the time indicating means.

6. A timekeeping device comprising time indicating means; a set shaft mounted for rotary and axially slidable movement for setting said time indicating means; a crown gear positioned on said set shaft for rotation therewith; regulating mechanism for adjusting the running speed of said device; a lever engaged by said crown gear when said set shaft is in its setting position for shifting said regulating mechanism; said lever being arranged to move out of engagement with the teeth of said crown gear when rotary movement of said set shaft exceeds a predetermined maximum amount; a circumferential groove formed in said set shaft; latch means arranged for insertion within said groove to restrict axially slidable movement of said set shaft to thereby maintain said adjusting lever out of engagement with said crown gear while permitting said set shaft to be moved between a non-setting position and its setting position to set the time indicating means; and timed means for automatically releasing said latch from said circumferential groove to permit said set shaft to be axially moved to an extreme non-setting position to thereby return said adjusting lever to an operative position with respect to said crown gear.

7. A timekeeping device comprising time indicating means; an hour hand gear; a set shaft mounted for rotary and axially slidable movement for setting said time indicating means; a crown gear positioned on said set shaft for rotation therewith; regulating mechanism for adjusting the running speed of said device; a lever engaged by said crown gear when said set shaft is in its setting position for shifting said regulating mechanism; said lever being arranged to move out of engagement with the teeth of said crown gear when rotary movement of said set shaft exceeds a predetermined maximum amount; a circumferential groove formed in said set shaft; latch means arranged for insertion within said groove to restrict axially slidable movement of said set shaft to thereby maintain said adjusting lever out of engagement with said crown gear while permitting said set shaft to be moved between a non-setting position and a setting position to set the time indicating means; and a pin fixed to the hour hand gear for removing said lockout latch from the circumferential groove once every twelve hours.

8. A timekeeping device comprising time indicating means; an hour hand gear; a set shaft mounted for rotary and axially slidable movement for setting said time indicating means; spring means for axially urging said set shaft away from its setting position; a crown gear positioned on said set shaft for rotation therewith; regulating mechanism for adjusting the running speed of said device; a lever engaged by the teeth of crown gear when said shaft is in its setting position for shifting said regulating mechanism; said lever being arranged to move out of engagement with the teeth of said crown gear when rotary movement of said set shaft exceeds a predetermined limited amount; a circumferential groove formed in said set shaft; latch means arranged for insertion within said groove to restrict axially slidable movement of said set shaft for maintaining said adjusting lever out of engagement with the teeth of said crown gear while permitting said set shaft to be axially slid between a non-setting position and a setting position to set the time indicating means; and a pin fixed to the hour hand gear for moving said lockout latch out of the circumferential groove once every twelve hours, said shaft being axially slid to an extreme non-setting position by said spring means when said latch is removed from said groove whereby to move the teeth of said crown gear into an operative position with respect to said adjusting lever.

9. A timekeeping device comprising time indicating means, means for setting said time indicating means including a regulator drive, regulating means for adjusting the running speed of said time indicating means drivably engageable with the regulator drive of said time setting means, said regulating means being disengageable from the regulator drive of said time setting means upon the occurrence of a predetermined movement of said time setting means so as to permit unimpeded additional movement of said time setting means, and means for maintaining said regulating means in the disengaged condition with respect to the regulator drive of said time setting means until the occurrence of a finite increment of movement of said time indicating means.

References Cited by the Examiner

UNITED STATES PATENTS

| 2,858,029 | 10/58 | Rabinow | 58—109 |
| 2,941,349 | 6/60 | Lux | 58—109 |
| 2,976,673 | 3/61 | Petters et al. | 58—109 |

FOREIGN PATENTS 787,002  11/57  Great Britain.

LEO SMILOW, *Primary Examiner.*

JOSEPH P. STRIZAK, H. R. MOSELY, *Examiners.*